Patented May 9, 1950

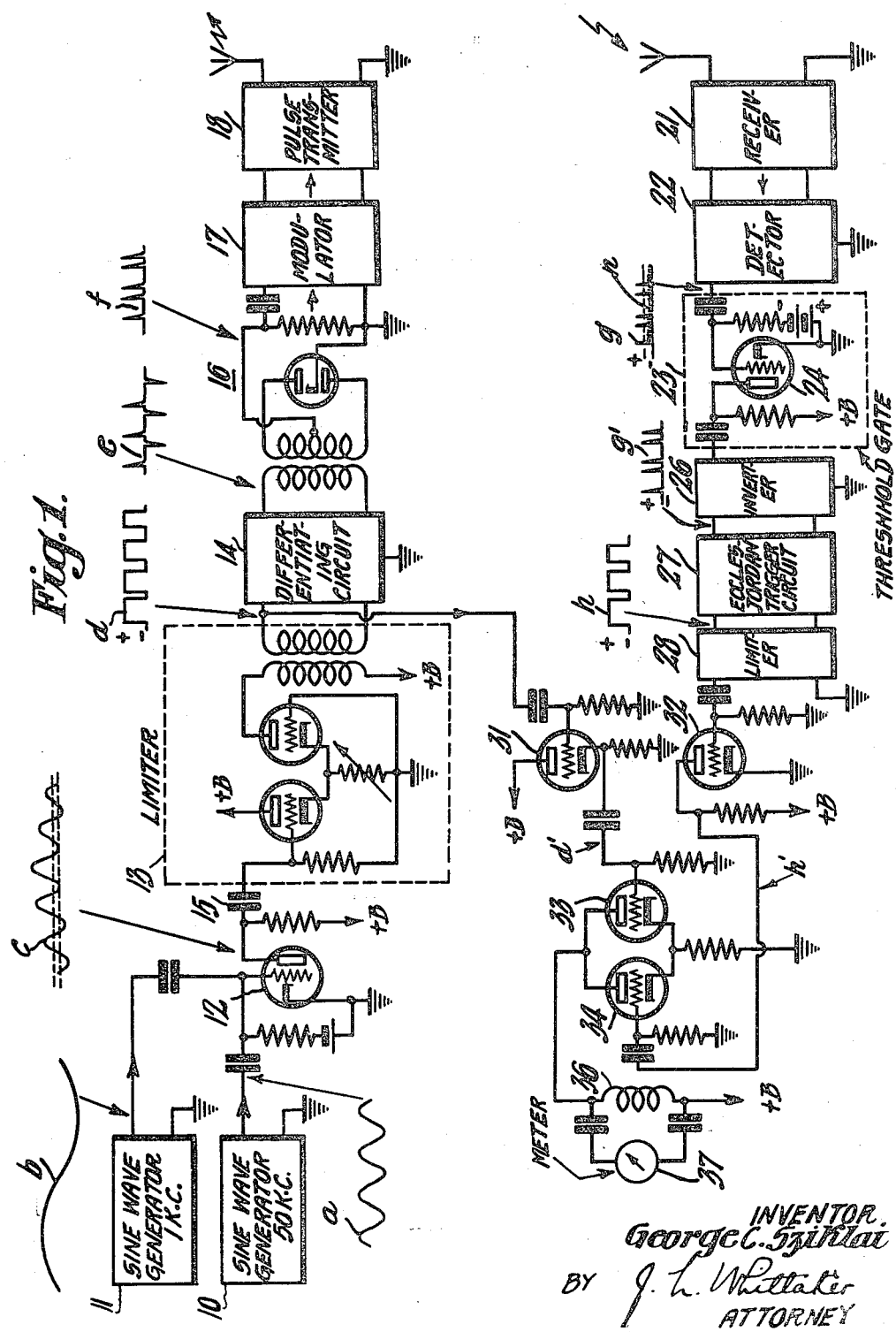

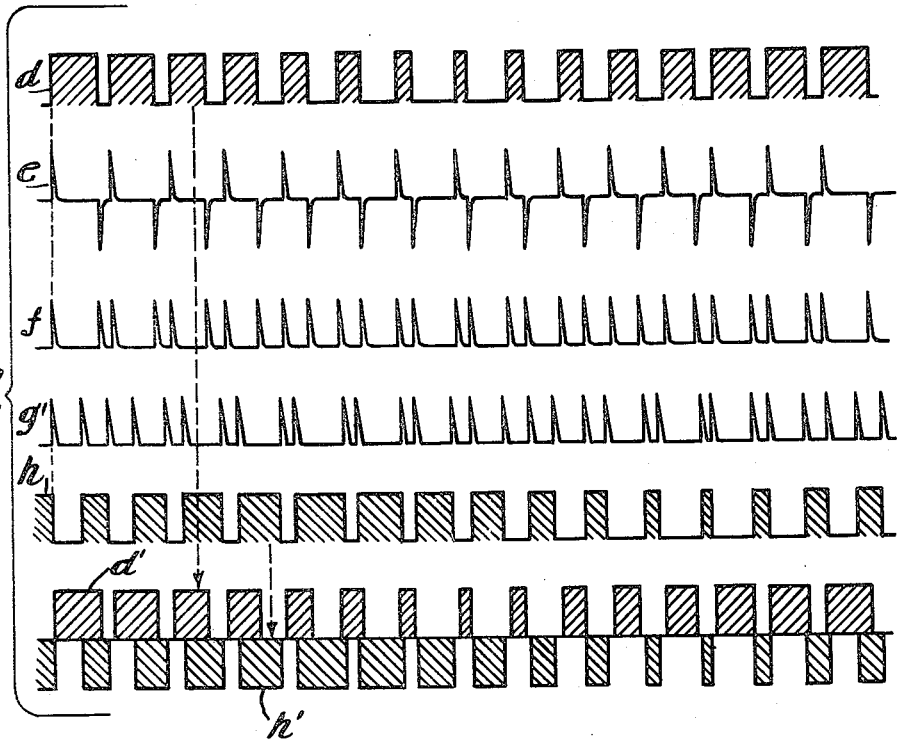

2,506,818

UNITED STATES PATENT OFFICE 2,506,818

RADIO ALTIMETER UTILIZING PHASE COMPARISON

George C. Sziklai, Laurel Road, N. J., assignor to Radio Corporation of America, a corporation of Delaware Application October 10, 1947, Serial No. 779,115

5 Claims. (Cl. 343—13)

My invention relates to the art of measuring distances by the use of reflected radio waves and particularly to a method of and means for measuring altitude.

An object of the invention is to provide an improved radio altimeter that will discriminate between the desired reflected signal and undesired disturbances such as noise, enemy interference, etc.

A further object of the invention is to provide an improved method of and means for measuring distance by the use of reflected radio waves.

A still further object of the invention is to provide an improved radio altimeter wherein the radio energy is transmitted in the form of pulses and wherein the altitude is indicated by a meter.

In practicing the invention a sine wave signal of 50 kc., for example, is converted into a rectangular wave signal wherein the rectangular pulses gradually increase in width and then decrease in width at a cyclic rate of 1 kc., for example. The rectangular wave signal is differentiated and the resulting pulses all made of the same polarity to produce pairs of narrow pulses having the same spacing as the widths of the rectangular pulses. These like polarity pulses modulate a radio transmitter and the resulting radio pulses are radiated to the earth or other reflecting surface. Since the pulses are of extremely short duration the transmitted power may be very high without increasing the average power output of the transmitter.

The reflected pulses are demodulated at the radio altimeter and the resulting video frequency pulses are caused to trigger an Eccles-Jordan trigger circuit or the like so as to produce a rectangular wave signal that is like the original rectangular wave signal.

However, the two rectangular wave signals differ in phase by an amount that is a function of the propagation time from the altimeter to the reflecting surface. The two rectangular wave signals are combined in polarity opposition and supplied to a meter. If there is no phase difference the meter reads zero. The greater the phase difference, the greater the meter reading. Thus the meter may be calibrated in distance or altitude.

As will be pointed out hereinafter, the received pulses may be clipped to remove undesired noise or interfering signals before they are applied to the Eccles-Jordan trigger circuit or other rectangular wave producing circuit.

The invention will be better understood from the following description taken in connection with the accompanying drawing in which:

Figure 1 is a block and circuit diagram of a radio altimeter embodying the invention, and Figure 2 is a group of graphs that are referred to in explaining the invention.

In the several figures similar graphs are indicated by similar reference characters.

Figure 1 shows an embodiment of the invention comprising a sine wave oscillator 10 operating at 50 kc. per second, for example, and a sine wave oscillator or tone generator 11 operating at 1 kc. per second, for example. The two sine waves signals $a$ and $b$ produced by oscillators 10 and 11, respectively, are applied to the input circuit of an amplifier tube 12 where they add to produce the wave $c$.

The wave $c$ is passed through a coupling capacitor 15 large enough to pass the 1 kc. component and is applied to a clipper or limiter 13 that clips in both the positive and negative direction as indicated by the dotted lines drawn through the wave $c$. The resulting output signal is a wave $d$ of rectangular pulses of varying width. The pulses of wave $d$ gradually decrease in width and then gradually increase in width, this change in width being in accordance with the wave form of the sine wave $b$.

The limiter 13 may be any one of several well known types. The particular one illustrated is described in Patent No. 2,276,565, issued March 17, 1942, to Murray G. Crosby.

The wave $d$ is differentiated by a suitable differentiating circuit 14 to produce the wave $e$ comprising positive and negative pulses. The wave $e$ is passed through a double wave rectifier 16 to produce the wave $f$ consisting of narrow pulses of like polarity.

Figure 2 shows the time relation of the waves $d$, $e$ and $f$. It will be apparent that the spacings between pairs of pulses in the wave $f$ correspond to the widths of the rectangular pulses of the wave $d$.

The pulses of wave $f$ are applied through a modulator 17 to a radio transmitter 18 whereby pulses of radio energy are radiated toward the earth or other reflecting surface.

The reflected radio pulses pass through a receiver 21 to a detector 22 where they are demodulated to produce video frequency pulses $g$. It will be noted that the pulses $g$ are the same as the pulses $f$ except that their phasing or timing has been changed by the time required for the radio wave to travel to the reflecting surface and back. Also, there will be a certain amount of noise included in the wave g.

The present invention makes it possible to eliminate undesired noise such as that indicated at n in the graph g and still obtain the desired distance reading by means of a phase comparison. It should be noted that reflections from surfaces other than the closest one will appear also as noise since they have a smaller amplitude than the first reflection. The wave g is passed through a threshold gate circuit 23 comprising a vacuum tube 24 that is biased sufficiently beyond cut-off to pass only the pulses which have a greater amplitude than that of the noise. A signal comprising pulses free of noise appears in the output circuit of the gate circuit 23, and after being reversed in polarity by a polarity reversing or inversion circuit 26 appears as the wave g'. The wave g' is applied to an Eccles-Jordan trigger circuit 27.

It should be understood that the noise may be removed from the reecived signal before demodulation if preferred by means of suitable well known circuits.

The E-J circuit 27 is triggered by each of the positive pulses of the wave g' to produce the rectangular wave h which corresponds to the original rectangular wave d. As will be apparent from Fig. 2, however, the wave h is shifted in phase or timing in the same way as the pulses g', the amount of phase shift being a measure of distance or altitude. An E-J trigger circuit of the type suitable for use in the present system is well known and is described, for example, in Radar Electronic Fundamentals, dated June 29, 1944, pages 192 to 194, and published by the War Department as TM 11–466. The wave h preferably is squared up by passing it through a limiter 28.

The rectangular wave d from limiter 13 and the rectangular wave h from limiter 28 are applied to the input circuits of amplifier tubes 31 and 32, respectively, whereby they are reversed in phase with respect to each other since tube 31 has a cathode output and tube 32 has a plate output. The output signals of tubes 31 and 32 are indicated at d' and h', respectively, in Fig. 2.

The waves d' and h' are applied to the input circuits of amplifier tubes 33 and 34, respectively, which have a common output circuit that includes an impedance coil 36. Thus the rectangular waves d' and h' are combined so that a phase comparison reading may be obtained by applying the combined signal to a meter 37. In the example shown, an A.-C. meter is employed.

From the foregoing it will be apparent that the waves d' and h' will be in phase (but of opposite polarity) when the altitude or distance is zero whereby the meter 37 will read zero.

When the altitude is not zero, an A.-C. signal having the frequency of the tone generator 11 is supplied to the meter. As the altitude increases, the waves d' and h' become displaced more in phase, the amplitude of the tone signal increases and the meter reading increases. When properly calibrated the meter 37 reads altitude in feet or in any desired units.

The range of the altimeter may be increased or decreased by decreasing or increasing the frequency of the tone generator 11.

In practice it may be desirable to put the altimeter in operation while the aircraft is on the ground and check to see that the altimeter reads zero. If the altimeter is then kept in operation there will be no chance that the altimeter reading will be incorrect due to the E-J trigger circuit 27 locking in with the pulses g' in the wrong polarity or phase.

The present invention combines the precision of a phase comparison indicator with the power economy of a pulse transmitter, and at the same time improves the overall signal-to-noise ratio due to its integration process.

I claim as my invention:

1. A distance measuring system comprising means for producing an electrical wave consisting of rectangular pulses that cyclically increase and decrease in width at a regular cyclic rate, means for producing pairs of pulses with the first and second pulses of a pair occurring in response to the occurrence of the leading and trailing edges, respectively, of each rectangular pulse of said wave, a radio transmitter, means for pulse modulating said transmitter by said pairs of pulses, means for radiating the resulting radio pulses toward a reflecting surface the distance to which is to be measured, means for receiving and demodulating said radio pulses after reflection from said surface, means for converting the demodulated pulses into a wave consisting of rectangular pulses and corresponding to the first-mentioned wave but having a phase relation thereto that is a function of the distance from said transmitter to said surface, and means included in the receiver for obtaining from said converted rectangular pulses and from rectangular pulses taken directly from the transmitter an output signal having an amplitude that is a function of the phase difference between said last-mentioned converted pulses and transmitter pulses and means for indicating said amplitude whereby said distance is indicated.

2. A distance measuring system comprising means for producing an electrical wave consisting of rectangular pulses that cyclically increase and decrease in width at a regular cyclic rate, means for producing pairs of pulses with the first and second pulses of a pair occurring in response to the occurrence of the leading and trailing edges, respectively, of each rectangular pulse of said waves, a radio transmitter, means for pulse modulating said transmitter by said pairs of pulses, means for radiating the resulting radio pulses toward a reflecting surface the distance to which is to be measured, means for receiving and demodulating said radio pulses after reflection from said surface, means for removing noise signals from the pulses after reception, means for converting the demodulated and noise free pulses into a wave consisting of rectangular pulses and corresponding to the first-mentioned wave but having a phase relation thereto that is a function of the distance from said transmitter to said surface, means for combining one of said waves of rectangular pulses with the other of said waves of rectangular pulses in polarity opposition and an alternating-current meter to which said combined waves are applied whereby said distance is indicated.

3. The method of measuring distance comprising producing an electrical wave consisting of rectangular pulses that cyclically increase and decrease in width at a regular cyclic rate, producing pairs of pulses with the first and second pulses of a pair occurring in response to the occurrence of the leading and trailing edges, respectively, of each rectangular pulse of said wave, radiating radio pulses corresponding to said pairs of pulses toward a reflecting surface the distance to which is to be measured, receiving and demodulating said radio pulses after reflection from said surface, converting the demodulated pulses into a wave consisting of rectangular pulses and corresponding to the first-mentioned wave but having a phase relation thereto that is a function of the distance from said transmitter to said surface, combining one of said waves of rectangular pulses with the other of said waves of rectangular pulses in polarity opposition whereby said combined wave has an alternating-current component having a frequency equal to said cyclic rate and having an amplitude that is a function of the phase difference of said combined waves, and means for indicating the amplitude of said component whereby said distance is indicated.

4. A distance measuring system comprising means for producing a sine wave signal at a certain frequency, means for producing a second sine wave signal at a substantially lower frequency than said certain frequency, means for adding said sine waves, means for limiting the added sine waves in both polarity directions to produce a wave consisting of rectangular pulses that vary in width as a function of the instantaneous amplitude of the second sine wave, means for differentiating said rectangular pulses to obtain narrow positive and negative pulses, means comprising a double rectifier for making all of said narrow pulses of the same polarity whereby there are pairs of like polarity pulses that correspond to the leading and trailing edges of said rectangular pulses, a radio transmitter, means for modulating said transmitter by said pairs of pulses, means for radiating the resulting radio pulses toward a reflecting surface the distance to which is to be measured, means for receiving and demodulating said radio pulses after reflection from said surface, means for passing only the portions of the received pulses that exceed a certain amplitude whereby comparatively low amplitude noise signals are eliminated, means for converting the resulting noise-free pairs of pulses into a wave consisting of rectangular pulses and corresponding to the first-mentioned wave but having a phase relation thereto that is a function of the distance from said transmitter to said surface, and means for determining and indicating said phase relation whereby said distance is indicated.

5. A distance measuring system comprising means for producing a sine wave signal at a certain frequency, means for producing a second sine wave signal at a substantially lower frequency than said certain frequency, means for adding said sine waves, means for limiting the added sine waves in both polarity directions to produce a wave consisting of rectangular pulses that vary in width as a function of the instantaneous amplitude of the second sine wave, means for differentiating said rectangular pulses to obtain narrow positive and negative pulses, means comprising a double rectifier for making all of said narrow pulses of the same polarity whereby there are pairs of like polarity pulses that correspond to the leading and trailing edges of said rectangular pulses, a radio transmitter, means for modulating said transmitter by said pairs of pulses, means for radiating the resulting radio pulses toward a reflecting surface the distance to which is to be measured, means for receiving and demodulating said radio pulses after reflection from said surface, means for passing only the portions of the received pulses that exceed a certain amplitude whereby comparatively low amplitude noise signals are eliminated, means comprising an Eccles-Jordan trigger circuit for converting the resulting noise-free pairs of pulses into a wave consisting of rectangular pulses and corresponding to the first-mentioned wave but having a phase relation thereto that is a function of the distance from said transmitter to said surface, and means for determining and indicating said phase relation whereby said distance is indicated.

GEORGE C. SZIKLAI.

REFERENCES CITED

The following references are of record in the file of this patent:

UNITED STATES PATENTS

| Number | Name | Date |
| --- | --- | --- |
| 2,266,401 | Reeves | Dec. 16, 1941 |
| 2,404,527 | Potapenko | July 23, 1946 |
| 2,406,970 | Smith | Sept. 3, 1946 |